United States Patent
Sugiura et al.

(10) Patent No.: US 9,560,182 B2
(45) Date of Patent: Jan. 31, 2017

(54) MOBILE TERMINAL APPARATUS, PROGRAM AND RECORDING MEDIUM WITH PROGRAM RECORDED

(75) Inventors: Kenji Sugiura, Tokyo (JP); Takao Oyobe, Tokyo (JP); Yasuko Oishi, Tokyo (JP); Megumi Matsuura, Tokyo (JP); Fumie Suzuki, Tokyo (JP); Yasuaki Shirogane, Tokyo (JP)

(73) Assignee: Rakuten, Inc., Tokyo (JP)

( * ) Notice: Subject to any disclaimer, the term of this patent is extended or adjusted under 35 U.S.C. 154(b) by 364 days.

(21) Appl. No.: 13/518,679

(22) PCT Filed: Dec. 24, 2010

(86) PCT No.: PCT/JP2010/073388
§ 371 (c)(1),
(2), (4) Date: Aug. 20, 2012

(87) PCT Pub. No.: WO2011/078342
PCT Pub. Date: Jun. 30, 2011

(65) Prior Publication Data
US 2013/0027329 A1  Jan. 31, 2013

(30) Foreign Application Priority Data

Dec. 25, 2009 (JP) ................................. 2009-295918

(51) Int. Cl.
*G06F 3/0346* (2013.01)
*H04M 1/725* (2006.01)
(Continued)

(52) U.S. Cl.
CPC ........ *H04M 1/72519* (2013.01); *G06F 1/1694* (2013.01); *G06F 3/0346* (2013.01);
(Continued)

(58) Field of Classification Search
None
See application file for complete search history.

(56) References Cited

U.S. PATENT DOCUMENTS

2005/0216867 A1* 9/2005 Marvit .................. G06F 1/1613
715/863
2009/0284463 A1* 11/2009 Morimoto ............. G06F 1/1616
345/156

(Continued)

FOREIGN PATENT DOCUMENTS

CN 101581968 A 11/2009
EP 2131263 A 12/2009

(Continued)

OTHER PUBLICATIONS

Korean Office Action dated Aug. 23, 2013, issued in Korean Patent Application No. 10-2012-7019120.

*Primary Examiner* — Chad Dicke
(74) *Attorney, Agent, or Firm* — Sughrue Mion, PLLC (57) ABSTRACT

A mobile terminal apparatus according to this invention comprises an acceleration sensor 14 that detects applied acceleration; a storing unit 12 that stores an acceleration condition set in advance for the detected acceleration and stores an alarm condition set in advance for the stored information; and control unit 11 and sound generating unit 16 that alarm about stored information in accordance with an alarming method set in advance so as to correspond to the alarm condition, when the detected acceleration satisfies the stored acceleration condition and the stored information satisfies the stored alarm condition.

11 Claims, 3 Drawing Sheets

| | ITEM | TOUCH POSITION | THRESHOLD DATA | SOUND TONE |
|---|---|---|---|---|
| ACCELERATION CONDITION DATA (THA) | ELECTRONIC MONEY BALANCE | UPPER END PORTION | 10,000 YEN | A |
| | | | 5,000 YEN | B |
| | | | 500 YEN | C |
| | POINT | LOWER END PORTION | 35,000 POINTS | D |
| | | | 20,000 POINTS | E |
| | | | 5,000 POINTS | F |
| | NUMBER OF ELECTRONIC MAILS UNREAD | RIGHT END PORTION | 5 ELECTRONIC MAILS | G |
| | | | 10 ELECTRONIC MAILS | H |
| | | | 15 ELECTRONIC MAILS | I |
| | REMAINING PERIOD UP TO SUBSEQUENT EXPECTED TIME | LEFT END PORTION | 1 HOUR | J |
| | | | 30 MINUTES | K |
| | | | 5 MINUTES | L |

(TH / 12)

(51) Int. Cl.
*G06F 1/16* (2006.01)
*G06F 3/041* (2006.01)

(52) U.S. Cl.
CPC ......... *G06F 3/041* (2013.01); *H04M 2250/12* (2013.01); *H04M 2250/22* (2013.01); *H04M 2250/60* (2013.01)

(56) References Cited

U.S. PATENT DOCUMENTS

| | | |
|---|---|---|
| 2009/0312051 A1 | 12/2009 | Hansson et al. |
| 2009/0318184 A1 | 12/2009 | Azami et al. |
| 2010/0069123 A1* | 3/2010 | Araradian ............ G06F 1/1626 455/566 |
| 2010/0164909 A1* | 7/2010 | Momono .............. G06F 1/1624 345/184 |
| 2010/0323671 A1* | 12/2010 | Jeong ........................ G01J 3/02 455/414.1 |

FOREIGN PATENT DOCUMENTS

| | | |
|---|---|---|
| JP | 07-325787 A | 12/1995 |
| JP | 11-231987 A | 8/1999 |
| JP | 2000-330946 A | 11/2000 |
| JP | 2001084324 A | 3/2001 |
| JP | 2003-244279 A | 8/2003 |
| JP | 2007034722 * | 7/2005 |
| JP | 2006-238141 A | 9/2006 |
| JP | 2007-034722 A | 2/2007 |

* cited by examiner

MOBILE TERMINAL APPARATUS, PROGRAM AND RECORDING MEDIUM WITH PROGRAM RECORDED

TECHNICAL FIELD

The present invention relates to a mobile terminal apparatus, a program, and a recording medium with the program recorded thereon, and more particularly, to a mobile terminal apparatus, a program, and a recording medium with the program recorded thereon which alarms stored information. The mobile terminal apparatus is a mobile radio telephone and a mobile information terminal apparatus. In the following description, the mobile radio telephone is simply referred to as a mobile telephone and the mobile information terminal apparatus is simply referred to as a PDA (Personal Digital Assistants).

BACKGROUND ART

A user generally carries the above-described mobile terminal apparatus in his or her bag or jacket pocket. The user does not view a display screen or the like of the mobile terminal apparatus all the time. Accordingly, when a time limit or the like defined by schedule information or the like stored in the mobile terminal apparatus approaches, it is convenient for the user to simply recognize the time limit or the like without taking out the mobile terminal apparatus from the bag or the like.

The conventional technologies suggested to meet such a demand are disclosed in, for example, Patent Document 1 and Patent Document 2 below. Patent Document 1 below discloses a technology of changing a period of an alarm sound or a melody in accordance with the degree of importance of a set schedule and alarming the arrival of a preset schedule time when the preset schedule time comes. Patent Document 2 below discloses a technology of changing a method of alarming call reception of a mobile telephone based on information indicating a preset state of the mobile telephone and day information.

CITATION LIST

Patent Document

Patent Document 1: Japanese Patent Application Laid-Open (JP-A) No. 7-325787
Patent Document 2: JP-A No. 2003-244279

SUMMARY OF THE INVENTION

Problem to be Solved by the Invention

The technology disclosed in Patent Document 1 is a technology of controlling the alarming method at an alarm timing set in advance by the user. In other words, the alarming operation itself is not performed when the alarm timing is not set in advance. Further, the technology disclosed in Patent Document 2 is a technology of controlling the alarming method under a condition that a timing of the call reception of the mobile telephone is set in advance as an alarm timing. Accordingly, the technologies disclosed in Patent Document 1 and Patent Document 2 have a problem that the user may not recognize information at any timing.

Accordingly, the invention is devised in light of the above-mentioned problems and an object of the invention is to provide a mobile terminal apparatus, a program, and a recording medium with the program recorded thereon capable of enabling a user to simply recognize about stored information at any timing.

Means for Solving the Problem

In order to achieve the above object, a mobile terminal apparatus described in claim 1 comprises: a storing means of an information storing unit or the like that stores information; an acceleration detecting means of an acceleration sensor or the like that detects applied acceleration; an acceleration condition storing means of a storing unit or the like that stores an acceleration condition set in advance for the detected acceleration; an alarm condition storing means of the storing unit or the like that stores an alarm condition set in advance for the stored information; and an alarming means of a control unit of the like that alarms about the stored information in accordance with an alarming method set in advance so as to correspond to the alarm condition, when the detected acceleration satisfies the stored acceleration condition and the stored information satisfies the stored alarm condition.

According to this invention, when the acceleration applied to the mobile terminal apparatus satisfies the acceleration condition and the information stored in the mobile terminal apparatus satisfies the alarm condition, about the stored information is alarmed in accordance with the alarming method set in advance so as to correspond to the alarm condition. Accordingly, the user of the mobile terminal apparatus can recognize about the stored information at any timing with ease.

Further, about the information is alarmed in accordance with the alarming method corresponding to the alarm condition. Accordingly, only the user who knows the alarm condition in advance can recognize about the information safely.

The mobile terminal apparatus described in claim 2 according to claim 1, wherein the stored information includes at least one of electronic value information, mail information, and schedule information.

According to this invention, the information stored in the mobile terminal apparatus includes at least one of the electronic value information, the mail information, and the schedule information. Accordingly, the user can recognize about each piece of the information at any timing with ease and also recognize each piece of the information safely.

The mobile terminal apparatus described in claim 3 according to claim 1 or 2, further comprising: an operation means of an operation unit or the like that is used to modify the alarm condition.

According to this invention, the alarm condition for the information can be modified through the operation unit. Accordingly, the user can recognize about the information under any alarm condition.

The mobile terminal apparatus described in claim 4 according to any one of claims 1 to 3, wherein the storing means stores a plurality of the information, the mobile terminal apparatus further comprises: a touch state detecting means of a touch sensor or the like that detects a touch state of a user; and a correspondence relation information storing means of the storing unit or the like that stores correspondence relation information indicating a correspondence relation between the detected touch state and either information, and when the detected acceleration satisfies the stored acceleration condition and the information corresponding to the detected touch state satisfies the stored alarm condition, the alarming means alarms about the information based on the stored correspondence relation information in accordance with the alarming method corresponding to the alarm condition.

According to this invention, the touch state of the user on the mobile terminal apparatus is detected and about the information is alarmed in accordance with the alarming method corresponding to the alarm condition, when the acceleration applied to the mobile terminal apparatus satisfies the acceleration condition and the information corresponding to the detected touch state satisfies the alarm condition. Accordingly, the user can separately recognize about each of the plurality of the information.

The mobile terminal apparatus described in claim 5 according to claim 4, wherein the touch state detecting means detects a touch position of the user as the touch state, the correspondence relation information is correspondence relation information indicating a correspondence relation between the touch position and either information, and when the detected acceleration satisfies the stored acceleration condition and the information corresponding to the detected touch position satisfies the stored alarm condition, the alarming means alarms about the information based on the stored correspondence relation information in accordance with the alarming method corresponding to the alarm condition.

According to this invention, the touch position of the user is detected as the touch state and the correspondence relation information is the correspondence relation information indicating the correspondence relation between the touch position and either information. Accordingly, the user can separately recognize about each of the plurality of information in a simple configuration.

The mobile terminal apparatus described in claim 6 according to claim 4, wherein the touch state detecting means detects the number of times the user performs touching as the touch state, the correspondence relation information is correspondence relation information indicating a correspondence relation between the number of times the user performs the touching and either information, and when the detected acceleration satisfies the stored acceleration condition and the information corresponding to the detected number of times the user performs the touching satisfies the stored alarm condition, the alarming means alarms about the information based on the stored correspondence relation information in accordance with the alarming method corresponding to the alarm condition.

According to this invention, the number of times the user performs the touching is detected as the touch state and the correspondence relation information is the correspondence relation information indicating the correspondence relation between the number of times the user performs the touching and either information. Accordingly, the user can separately recognize about each of the plurality of information in a simple configuration.

The mobile terminal apparatus described in claim 7 according to claim 4, wherein the touch state detecting means detects a touch pressure of the user as the touch state, the correspondence relation information is correspondence relation information indicating a correspondence relation between the touch pressure and either information, and when the detected acceleration satisfies the stored acceleration condition and the information corresponding to the detected touch pressure satisfies the stored alarm condition, the alarming means alarms about the information based on the stored correspondence relation information in accordance with the alarming method corresponding to the alarm condition.

According to this invention, the touch pressure of the user is detected as the touch state and the correspondence relation information is the correspondence relation information indicating the correspondence relation between the touch pressure and either information. Accordingly, the user can separately recognize about each of the plurality of information in a simple configuration.

The mobile terminal apparatus described in claim 8 according to claim 4, wherein the touch state detecting means detects an area of a touch region of the user as the touch state, the correspondence relation information is correspondence relation information indicating a correspondence relation between the area of the touch region and either information, and when the detected acceleration satisfies the stored acceleration condition and the information corresponding to the detected area of the touch region satisfies the stored alarm condition, the alarming means alarms about the information based on the stored correspondence relation information in accordance with the alarming method corresponding to the alarm condition.

According to this invention, the area of the touch region of the user is detected as the touch state and the correspondence relation information is the correspondence relation information indicating the correspondence relation between the area of the touch region and either information. Accordingly, the user can separately recognize about each of the plurality of information in a simple configuration.

The mobile terminal apparatus described in claim 9 according to any one of claims 1 to 8, wherein the alarm condition storing means stores a plurality of the alarm conditions for one kind of the information, and when the detected acceleration satisfies the stored acceleration condition and the stored information satisfies any one of the alarm conditions for the corresponding information, the alarming means alarms about the information in accordance with the alarming method corresponding to the any one of the alarm conditions.

According to this invention, the plurality of the alarm conditions are stored for one kind of the information and about the information is alarmed in accordance with the alarming method corresponding to any one of the alarm conditions, when the information satisfies any one of the alarm conditions for the information. Accordingly, the user can recognize the relation between about one kind of information and each alarm condition in further detail.

A program described in claim 10 causing a computer included in a mobile terminal apparatus to function as: an acceleration detecting means that detects acceleration applied to the mobile terminal apparatus; an acceleration condition storing means that stores an acceleration condition set in advance for the detected acceleration; an alarm condition storing means that stores an alarm condition set in advance for information stored in the mobile terminal apparatus; and an alarm control means that causes an alarming means to alarm about the stored information in accordance with an alarming method set in advance so as to correspond to the alarm condition, when the detected acceleration satisfies the stored acceleration condition and the stored information satisfies the stored alarm condition.

A recording medium described in claim 11 with a program recorded thereon so as to be read by a computer included in a mobile terminal apparatus, the program causing the computer to function as: an acceleration detecting means that detects acceleration applied to the mobile terminal apparatus; an acceleration condition storing means that stores an acceleration condition set in advance for the detected acceleration; an alarm condition storing means that stores an alarm condition set in advance for information stored in the mobile terminal apparatus; and an alarm control means that causes an alarming means to alarm about the stored information in accordance with an alarming method set in advance so as to correspond to the alarm condition, when the detected acceleration satisfies the stored acceleration condition and the stored information satisfies the stored alarm condition.

Effect of the Invention

According to the aspects of the invention, the user of the mobile terminal apparatus can recognize about the information stored in the mobile terminal apparatus at any timing and with ease. Further, only the user who knows the alarm condition in advance can recognize about information safely.

MODES FOR CARRYING OUT THE INVENTION

Next, an embodiment of the invention will be described with reference to the drawings. The embodiment and modified examples to be described below are an embodiment and modified examples when the invention is applied to mobile terminal apparatus such as the mobile telephone or the PDA described above.

(I) Embodiment

Figure 1:
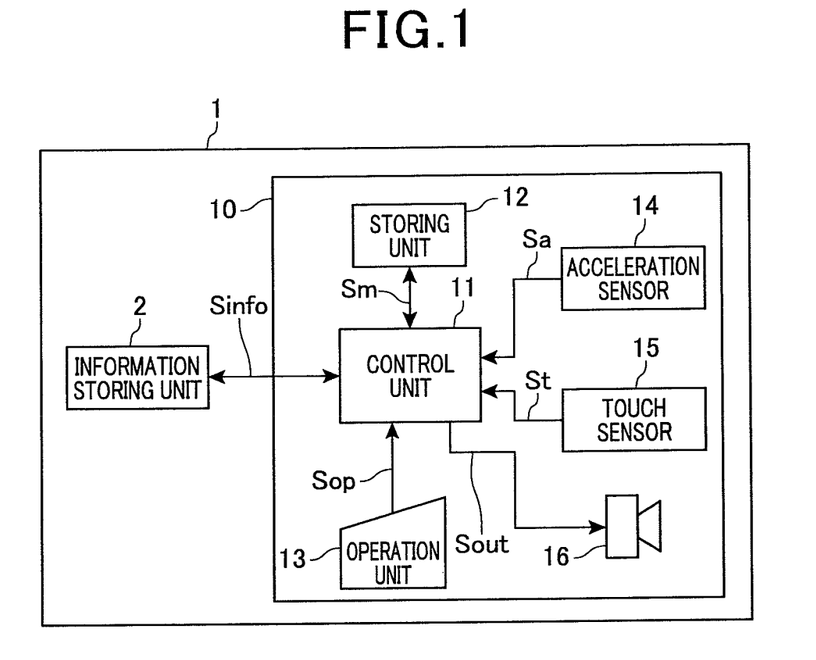
FIG. 1 is a block diagram illustrating the overall configuration of a mobile terminal apparatus according to an embodiment.
Figure 2A:
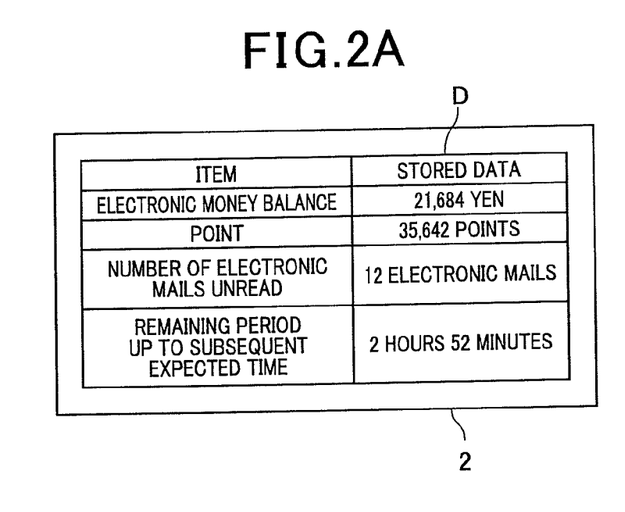
FIG. 2A is a diagram illustrating an example of stored data according to the embodiment.
Figure 2B:
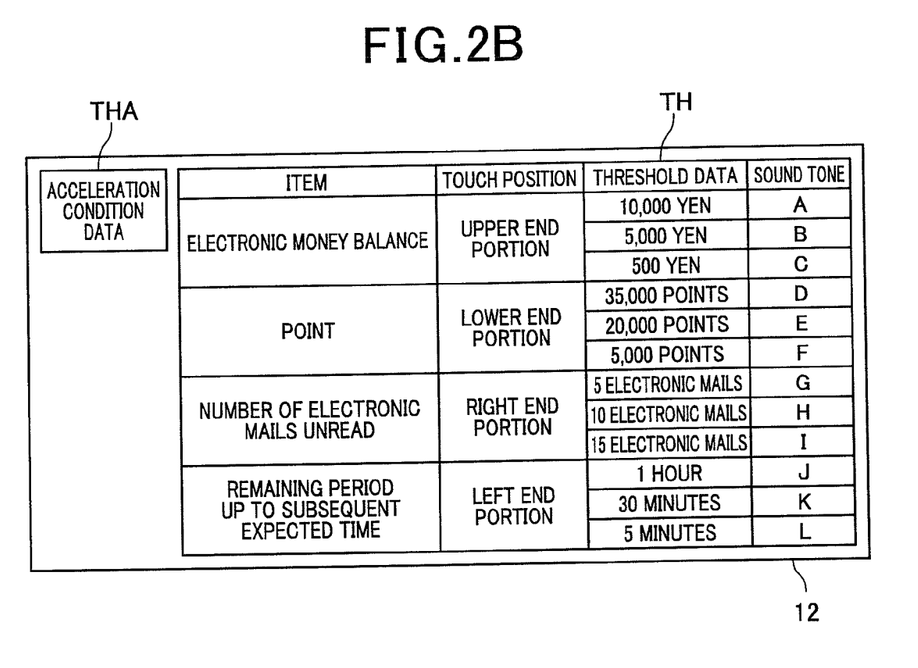
FIG. 2B is a diagram illustrating an example of alarm condition data according to the embodiment.
Figure 3:
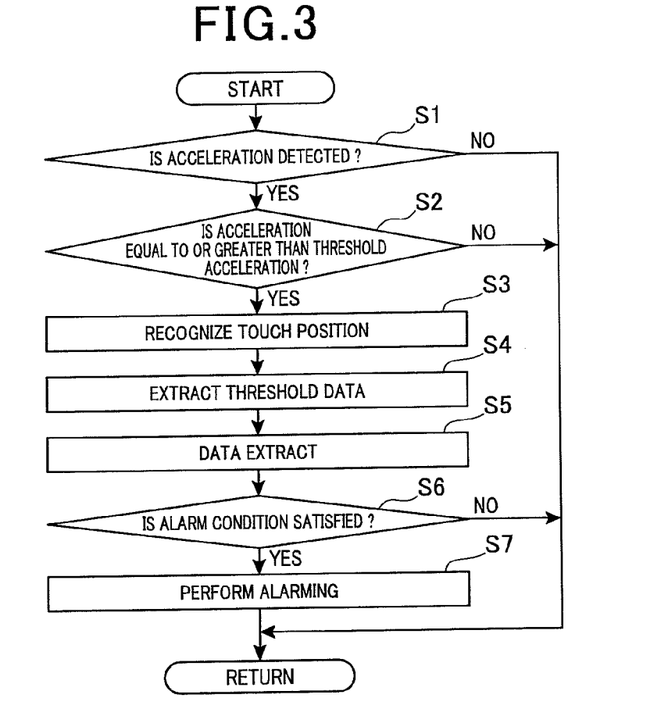
FIG. 3 is a flowchart illustrating an alarming operation according to the embodiment.

First, the embodiment of the invention will be described with reference to FIGS. 1 to 3. FIG. 1 is a block diagram illustrating the overall configuration of a mobile terminal apparatus according to the embodiment. FIGS. 2A and 2B are diagrams illustrating examples of stored data or the like according to the invention. FIG. 3 is a flowchart illustrating an alarming operation according to the embodiment. FIG. 1 illustrates only the configuration of units of the mobile terminal apparatus according to the invention. For example, a calling unit and a communication unit of the mobile terminal apparatus are not illustrated.

As illustrated in FIG. 1, a mobile terminal apparatus 1 according to the embodiment includes an information storing unit 2 as an example of a storing means and an alarming unit 10. In this configuration, the information storing unit 2 stores various kinds of stored data D supplied so as to be used by a user of the mobile terminal apparatus 1. For example, in the example of FIG. 2A, the information storing unit 2 stores information regarding a so-called electronic money balance corresponding to 21,684 yen available using the mobile terminal apparatus 1, information regarding an accumulation number of so-called points corresponding to 35,642 points (35,642 yen) being able to be transferred to a commodity price when a commodity is purchased, data of twelve electronic mails which have been received by the mobile terminal apparatus 1 but have not been read, and information regarding a schedule in which the remaining period up to start is 2 hours 52 minutes. The information storing unit 2 transmits and receives the contents of the stored data D as an information signal Sinfo to and from a control unit 11 described below of the alarming unit 10.

On the other hand, the alarming unit 10 includes a control unit 11 that is an example of an alarming means configured by a CPU, a RAM (Random Access Memory), a ROM (Read Only Memory), and the like; a storing unit 12 that is an example of an acceleration condition storing means, an example of an alarm condition storing means, an example of a correspondence relation information storing unit; an operation unit 13 that is an example of an operation means configured by an operation button and the like; an acceleration sensor 14 that is an example of an acceleration detecting means including a sensor or the like measuring a change in speed for example; a resistance type, electrostatic capacitance type, pressure type, or optical type touch sensor 15 that is an example of a touch state detecting means; and a sound generating unit 16 that is an example of an alarming means.

In this configuration, the acceleration sensor 14 detects the direction and magnitude of an acceleration applied to the mobile terminal apparatus 1 when the mobile terminal apparatus 1 is grasped and shaken by a user. Then, the acceleration sensor 14 generates acceleration information Sa including the detection result and outputs the generated acceleration information Sa to the control unit 11. This acceleration information Sa is consequently acceleration information that indicates the direction and magnitude of an acceleration obtained by composing, for example, an acceleration applied to the mobile terminal apparatus 1 shaken in the above-described manner and the acceleration of gravity normally applied to the mobile terminal apparatus 1. Further, the acceleration information Sa may be acceleration information that indicates the direction and magnitude of only an acceleration applied to the mobile terminal apparatus 1, for example, when the mobile terminal apparatus 1 is shaken by a user, as described above.

On the other hand, the touch sensor 15 is provided as, for example, a touch panel on the entire surface of a display unit of the mobile terminal apparatus 1. Thus, the touch sensor 15 generates touch information St indicating a position at which the user touches a portion on the touch sensor 15 with his or her finger or palm, or the like, and then outputs the generated touch information St to the control unit 11. Further, the touch sensor 15 may be provided not only on the entire surface of the display unit of the mobile terminal apparatus 1 but also, for example, a corner portion or a side surface of a casing (not illustrated) or a predetermined portion of the rear surface of the casing of the mobile terminal apparatus 1.

Next, the storing unit 12 stores alarm condition data TH exemplified in FIG. 2B. This alarm condition data TH includes information indicating the touch position of the mobile terminal apparatus 1 corresponding to the items, threshold data as the contents of corresponding items when the sound tone of a sound generated from the sound generating unit 16 is switched at the time of alarming about each item to the user, and information indicating the sound tone corresponding to each threshold data when alarmed, in the same items as the items of the stored data D stored in the information storing unit 2. In the alarming operation of the embodiment, the contents themselves of the stored data D to be alarmed are not alarmed, but the fact that the value of the stored data D exceeds a threshold indicated by the threshold data or not is alarmed by a buzzer or a melody of the corresponding sound tone. For example, in the case of an electronic money balance exemplified in FIG. 2A, the electronic money balance at that time itself is not read as, for example, "twenty thousands, one thousand, six hundreds, eighty, four yen" by a voice, but the fact that the balance exceeds the threshold indicated by the threshold data or not is alarmed by a buzzer or a melody of the corresponding sound tone. The storing unit 12 transmits and receives the contents of the alarm condition data TH as a memory signal Sm to and from the control unit 11.

More specifically, in the example of FIG. 2B, first, "UPPER END PORTION" of the touch sensor 15 as the touch position of the mobile terminal apparatus 1 corresponds to the item "ELECTRONIC MONEY BALANCE" as the alarm condition data TH. Three kinds of sound tones "A" to "C" correspond to the sound tones when alarmed. In regard to the threshold data when the three kinds of sound tones are selected and used, "10,000 yen", "5,000 yen", and "500 yen" correspond to these sound tones, respectively. First, the threshold data represents that the alarming operation is performed by a buzzer, a melody, or the like of the sound tone A when the electronic money balance is equal to or greater than 5,000 yen and is less than 10,000 yen. Likewise, the threshold data represents that the alarming operation is performed by a buzzer, a melody, or the like of the sound tone B when the electronic money balance is equal to or greater than 500 yen and is less than 5,000 yen. Likewise, the threshold data represents that the alarming operation is performed by a buzzer, a melody, or the like of the sound tone C when the electronic money balance is less than 500 yen. Further, as described later, the alarming operation is not performed by a buzzer, a melody, or the like when the electronic money balance is equal to or greater than 10,000 yen. In the example described above, the threshold data is used as the upper limit of the electronic money balance. However, the threshold data may be set as the lower limit of the electronic money balance so that the alarming operation is performed by the buzzer, the melody, or the like of the sound tone A, for example, when the electronic money balance is equal to or greater than 10,000 yen.

Next, "LOWER END PORTION" of the touch sensor 15 as the touch position of the mobile terminal apparatus 1 corresponds to the item "POINT." Three kinds of sound tones "D" to "F" correspond to sound tones when alarmed. In regard to the threshold data when the three kinds of sound tones are selected and used, "35,000 points", "20,000 points", and "5,000 points" correspond to these sound tones, respectively. First, the threshold data represents that the alarming operation is performed by a buzzer, a melody, or the like of the sound tone D when the point is equal to or greater than 20,000 points and is less than 35,000 points. Likewise, the threshold data represents that the alarming operation is performed by a buzzer, a melody, or the like of the sound tone E when the point is equal to or greater than 5,000 points and is less than 20,000 points. Likewise, the threshold data represents that the alarming operation is performed by a buzzer, a melody, or the like of the sound tone F when the point is less than 5,000 points. Further, as described later, the alarming operation is not performed by a buzzer, a melody, or the like when the point is equal to or greater than 35,000 points. In the example described above, the threshold data is used as the upper limit of the point. However, the threshold data may be set as the lower limit of the point so that the alarming operation is performed by the buzzer, the melody, or the like of the sound tone D, for example, when the point is equal to or greater than 35,000 points.

Next, "RIGHT END PORTION" of the touch sensor 15 as the touch position of the mobile terminal apparatus 1 when viewed from the front side of the touch sensor 15 corresponds to the item "NUMBER OF ELECTRONIC MAILS UNREAD." Three kinds of sound tones "G" to "I" correspond to sound tones when alarmed. In regard to the threshold data when the three kinds of sound tones are selected and used, "5 electronic mails", "10 electronic mails", and "15 electronic mails" correspond to these sound tones, respectively. First, the threshold data represents that the alarming operation is performed by a buzzer, a melody, or the like of the sound tone G when the number of electronic mails unread is equal to or greater than 5 and is less than 10. Likewise, the threshold data represents that the alarming operation is performed by a buzzer, a melody, or the like of the sound tone H when the number of electronic mails unread is equal to or greater than 10 and is less than 15. Likewise, the threshold data represents that the alarming operation is performed by a buzzer, a melody, or the like of the sound tone I when the number of electronic mails unread is equal to or greater than 15. Further, as described later, the alarming operation is not performed by a buzzer, a melody, or the like when the number of electronic mails unread is less than 5.

Finally, "LEFT END PORTION" as the touch position of the mobile terminal apparatus 1 when viewed from the front side of the touch sensor 15 corresponds to the item "REMAINING PERIOD UP TO SUBSEQUENT EXPECTED TIME." Three kinds of sound tones "J" to "L" correspond to sound tones when alarmed. In regard to the threshold data when the three kinds of sound tones are selected and used, "1 hour", "30 minutes", and "5 minutes" correspond to these sound tones, respectively. First, the threshold data represents that the alarming operation is performed by a buzzer, a melody, or the like of the sound tone J when the remaining period is equal to or greater than 30 minutes and is less than 1 hour. Likewise, the threshold data represents that the alarming operation is performed by a buzzer, a melody, or the like of the sound tone K when the remaining period is equal to or greater than 5 minutes and is less than 30 minutes. Likewise, the threshold data represents that the alarming operation is performed by a buzzer, a melody, or the like of the sound tone L when the remaining period is equal to or less than 5 minutes. Further, as described later, the alarming operation is not performed by a buzzer, a melody, or the like when the remaining period is equal to or greater than 1 hour.

The storing unit 12 further stores, as acceleration condition data THA, a threshold of the magnitude of an acceleration detected by the acceleration sensor 14. In the following description, this threshold is referred to as a threshold acceleration. In the alarming operation according to the embodiment, a necessary alarming operation is performed when an acceleration having the magnitude equal to or greater than the threshold acceleration is detected by the acceleration sensor 14. The storing unit 12 also transmits and receives the acceleration condition data THA as the memory signal Sm to and from the control unit 11.

Next, the operation unit 13 outputs an operation signal Sop corresponding to an operation or the like to the control unit 11, when the user performs an instruction inputting operation or the like to operate the alarming unit 10.

Lastly, the sound generating unit 16 actually generates the buzzer, the melody, or the like described above to perform the alarming operation according to the embodiment based on an output signal Sout output from the control unit 11.

In these configurations, referring to the alarm condition data TH and the acceleration condition data THA stored in the storing unit 12, the control unit 11 controls the alarming operation to be described below according to the embodiment based on the operation signal Sop from the operation unit 13, the acceleration information Sa from the acceleration sensor 14, and the touch information St from the touch sensor 15. The control unit 11 further rewrites the alarm condition data TH and the acceleration condition data THA stored in the storing unit 12 based on the operation contents of the operation unit 13. More specifically, based on the operation contents described above, the control unit 11 rewrites the value of the threshold acceleration as the acceleration condition data THA and each threshold data of the alarm condition data TH. Thus, the user arbitrarily rewrites the value of the threshold acceleration and the threshold data associated with the alarming operation according to the embodiment to be arbitrarily able to control the timing, the sound tone, or the like of this alarming operation.

Next, the alarming operation according to the embodiment will be described in detail with reference to FIGS. 1 to 3. The alarming operation illustrated in FIG. 3 is repeatedly performed, for example, at a constant time interval, as a part of the main routine of an operation of the mobile terminal apparatus 1.

In the alarming operation according to the embodiment, as illustrated in FIG. 3, the control unit 11 first starts monitoring whether the acceleration sensor 14 has detected an acceleration when the above alarming operation starts which is repeatedly performed at a constant time interval (step S1). When the acceleration is not detected in the operation of step S1 (NO in step S1), the control unit 11 terminates the alarming operation according to the embodiment and causes the alarming operation to return to the original main routine. Conversely, when an acceleration is detected in the operation of step S1 (YES in step S1), the control unit 11 subsequently determines whether the magnitude of the detected acceleration is equal to or greater than the magnitude of the threshold acceleration stored as the acceleration data THA in the storing unit 12 at the detection timing based on the acceleration information Sa (step S2). In the determination of step S2, the acceleration condition data THA stored in the storing unit 12 is read by the control unit 11 and the threshold acceleration as the acceleration data THA is compared to the magnitude of the acceleration detected by the acceleration sensor 14. When the magnitude of the detected acceleration is not equal to or greater than the magnitude of the threshold acceleration in the determination of step S2 (NO in step S2), the control unit 11 terminates the alarming operation according to the embodiment and causes the alarming operation to return to the original main routine. Conversely, when the magnitude of the detected acceleration is equal to or greater than the magnitude of the threshold acceleration in the determination of step S2 (YES in step S2), the control unit 11 subsequently confirms the position of the mobile terminal apparatus 1 touched by the user at the timing at which the acceleration sensor 14 detects the acceleration based on the touch information St (step S3).

Next, referring to the item of the alarm condition data TH corresponding to the touch position confirmed in step S3, the control unit 11 extracts the threshold data of the item (step S4). More specifically, for example, when the touch position confirmed in step S3 is the upper end portion of the touch sensor 15, the control unit 11 extracts the threshold data corresponding to the electronic money balance of the alarm condition data TH from the storing unit 12 (see FIG. 2B). Likewise, when the touch position confirmed in step S3 is the right end portion of the touch sensor 15, the control unit 11 extracts the threshold data corresponding to the number of electronic mails unread in the alarm condition data TH from the storing unit 12 (see FIG. 2B).

Next, the control unit 11 extracts the stored data D of the item corresponding to the threshold data extracted in step S4 from the information storing unit 2 (step S5). More specifically, for example, when the threshold data extracted in step S4 is the threshold data associated with the electronic money balance, the control unit 11 extracts the stored data D of this electronic money balance from the information storing unit 2.

Then, the control unit 11 compares the threshold data extracted in the operation of step S4 to the stored data D extracted in the operation of step S5 (step S6). When the value of the stored data D extracted in the operation of step S5 does not satisfy the alarm condition of the threshold data extracted in the operation of step S4 in the comparison of step S6 (NO in step S6), the control unit 11 terminates the alarming operation according to the embodiment without performing an operation (that is, performs no alarming operation) and causes the alarming operation to return to the original main routine. Conversely, when the value of the stored data D extracted in the operation of step S5 satisfies the alarm condition of the threshold data extracted in the operation of step S4 in the comparison of step S6 (YES in step S6), the control unit 11 causes the sound generating unit 16 to generate a buzzer or a melody suitable for the satisfied alarm condition (step S7). Thereafter, the control unit 11 returns the alarming operation to the original main routine. Specifically, in regard to these operations of step S6 and step S7, for example, when the threshold data extracted in step S4 is the threshold data associated with the electronic money balance and the value of the stored data D extracted in the operation of step S5 is 800 yen (YES in step S6), the control unit 11 causes the sound generating unit 16 to generate the buzzer, the melody, or the like of the sound tone B with reference to the threshold data extracted in step S4. Likewise, when the threshold data extracted in step S4 is the threshold data associated with the number of electronic mails unread and the value of the stored data D extracted in the operation of step S5 is 20 mails (YES in step S6), the control unit 11 causes the sound generating unit 16 to generate the buzzer, the melody, or the like of the sound tone I with reference to the threshold data extracted in step S4. On the other hand, when the threshold data extracted in step S4 is the threshold data associated with the electronic money balance and the value of the stored data D extracted in the operation of step S5 is 21, 684 yen (see FIG. 2A), the control unit 11 performs no alarming operation by a buzzer, a melody, or the like with reference to the threshold data extracted in step S4 (NO in step S6).

In the operation of the alarming unit 10 of the mobile terminal apparatus 1 according to the embodiment, as described above, when the magnitude of the acceleration applied to the mobile terminal apparatus 1 is equal to or greater than the threshold acceleration and the value of the stored data D stored in the mobile terminal apparatus 1 satisfies the alarm condition associated with the alarm condition data TH, the alarming unit 10 informs the user that the stored data D satisfies the alarm condition. Accordingly, the user of the mobile terminal apparatus 1 can recognize that the stored data D stored in the storing unit 2 satisfies the alarm condition at any timing and with ease.

Moreover, since the alarming unit 10 does not inform the user of the stored data D itself, but informs the user that the stored data D satisfies the alarm condition using an arbitrary buzzer or melody, the stored data D itself is not known to those around the user and only the user who knows the alarm condition can recognize the stored data D itself securely.

Furthermore, since the alarm condition data TH for the stored data D can be modified through the operation unit 13, only the user who has set the alarm condition associated with the alarm condition data TH can recognize that the stored data D satisfies the alarm condition based on an arbitrary alarm condition.

Furthermore, since the touch position of the user on the mobile terminal apparatus 1 is detected and the items of the stored data D to be alarmed are classified and alarmed based on the detected touch position, the user can separately recognize that each of the plural kinds of stored data D satisfies the alarm condition in a simple configuration.

Furthermore, the plurality of threshold data are stored for one kind of stored date D in the storing unit 12. When the stored data D satisfies any of alarm conditions for this stored data D, the alarming unit 10 alarms the fact that the stored data D satisfies this alarm condition. Thus, the user can recognize a relation between one kind of stored data D and each alarm condition in further detail.

Furthermore, since the alarming unit 10 alarms the fact that the stored data D satisfies the alarm condition using a sound corresponding to the alarm condition, the user can intuitively recognize that the stored data D satisfies the alarm condition.

(II) Modified Examples

Next, modified examples of the invention will be described.

Figure 4:
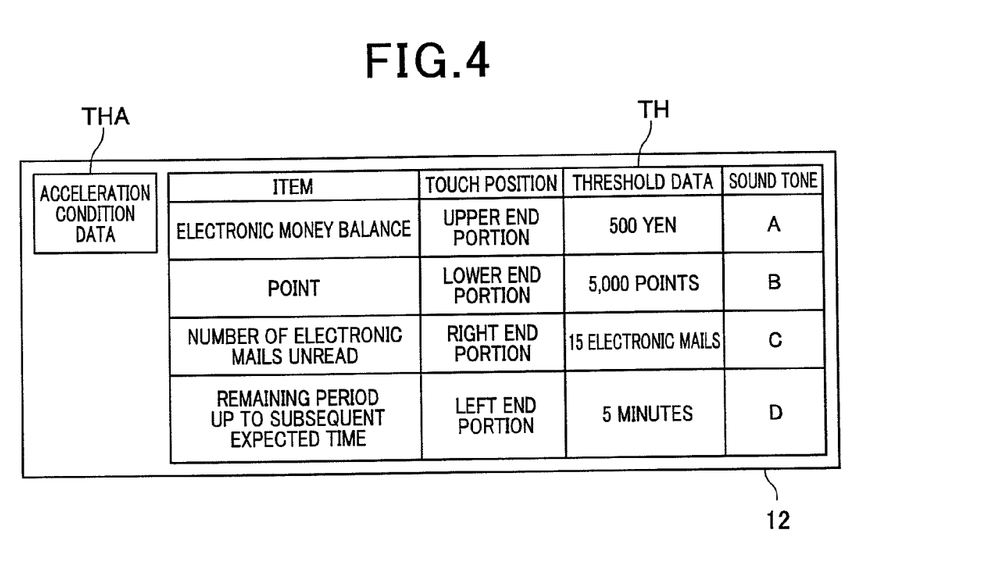
FIG. 4 is a diagram illustrating an example of alarm condition data according to modified examples.

In the above-described embodiment, the case has hitherto been described in which three pieces of threshold data are provided for one kind of item of the stored data D (see FIG. 2B). In a first modified example, however, only one piece of threshold data can be provided for one kind of item, as in alarm condition data TH2 exemplified in FIG. 4. In this case, for example, in regard to the electronic money balance, only when the electronic money balance is equal to or less than 5,000 yen, the alarming unit is configured to alarm the fact. According to the first modified example, the data amount of alarm condition data TH2 can be reduced and the storage area of the storing unit 12 can be utilized efficiently.

Next, in the above-described embodiment, the case has hitherto been described in which the alarming unit does not perform the alarming operation, for example, when the electronic money balance is equal to or greater than 10,000 yen. In a second modified example, however, even when the electronic money balance is equal to or greater than 10,000 yen, the alarming unit can be configured to alarm the fact using a buzzer, a melody, or the like of another sound tone other than the sound tones A to L exemplified in FIG. 2B. Likewise, even when the number of electronic mails unread is equal to or less than 5, the alarming unit can be configured to alarm the fact using a buzzer, a melody, or the like of yet another sound tone other than the sound tones A to L. According to the second modified example, since certain sound tones are assigned to all of the values used as the stored data D, the convenience is further improved for the alarming unit 10.

Furthermore, in the above-described embodiment, the case has hitherto been described in which the alarming unit performs the alarming operation using the buzzers, the melodies, or the like of different "sound tones" for the threshold data. In a third modified example, however, the alarming unit can be configured to perform the alarming operation using buzzers, melodies, or the like of different sound volumes for the threshold data. Further, the alarming unit can be configured to perform the same alarming operation, as in the embodiment, using buzzers, melodies, or the like of different sound lengths for the threshold data. Even in these cases, the same advantages as those of the above-described embodiment can be obtained.

Next, in the above-described embodiment, the case has hitherto been described in which the items of the stored data D to be alarmed are classified and alarmed based on the touch position of the user on the mobile terminal apparatus 1. In a fourth modified example, however, the alarming unit can be configured to perform the same alarming operation, as in the above-described embodiment, by classifying the items of the stored data D to be alarmed based on the number of times the user touches a portion on the mobile terminal apparatus 1 per preset unit time, a touch pressure at the touching time, or the area of a touch region. Even in this case, the same advantages as those of the above-described embodiment can be obtained. The area of the touch region can be calculated based on the coordinates of a portion which the user touches on the touch panel 15. Further, the area of the touch region can be calculated based on the touch determination of each optical sensor installed in each of the pixels of a display unit. In regard to the number of times the user touches the mobile terminal apparatus, for example, the number of times the user touches a specific position determined in advance on the touch sensor 15 within a preset time (for example, 2 seconds) can be used as the number of times the user touches the mobile terminal apparatus. Alternatively, the number of times the user touches the specific position continuously at a time interval equal to or greater than a preset time interval (for example, 0.2 seconds) can be used. In regard to the touch pressure, a pressure sensor formed of a transparent electrode or the like can be superimposed on the touch sensor 15 and an output value from the pressure sensor can be used as the touch pressure. Not only the items of the stored data D can be classified and alarmed based on the touch position of the a finger, a palm, or the like of the user, the number of times the finger, the palm, or the like of the user touches the mobile terminal apparatus 1, or the touch pressure of the finger, the palm, or the like of the user, but also the items of the stored data D can be classified and alarmed based on a position at which touching of a finger or the like is not detected (for example, only an upper portion is not touched among the upper, lower, right, and left portions of the mobile terminal apparatus 1).

Furthermore, in the above-described embodiment, the case has hitherto been described in which the items of the stored data D to be alarmed are classified and alarmed based on the touch position of the user on the mobile terminal apparatus 1. In a fifth modified example, however, the direction and the magnitude of the acceleration separately detected by the acceleration sensor 14 are used. That is, the magnitude of the acceleration is used to determine whether the alarming operation is performed, as in the above-described embodiment, and the direction of the acceleration is used to classify the items of the stored data D. More specifically, for example, when the acceleration is detected in the vertical direction due to shaking of the mobile terminal apparatus 1 in the vertical direction, this vertical direction of the acceleration is assigned to "ELECTRONIC MONEY BALANCE" of the stored data D. For example, when the acceleration is detected in the horizontal front and rear directions due to shaking of the mobile terminal apparatus 1 in the horizontal front and rear direction, the horizontal front and rear directions of the acceleration are assigned to "POINT" of the stored data D. For example, when the acceleration is detected in the horizontal right and left directions due to shaking of the mobile terminal apparatus 1, the horizontal right and left directions of the acceleration are assigned to "NUMBER OF ELECTRONIC MAILS UNREAD" of the stored data D. For example, when the acceleration is detected in an inclination direction due to shaking of the mobile terminal apparatus 1, the inclination direction of the acceleration is assigned to "REMAINING TIME UP TO SUBSEQUENT EXPECTED TIME" of the stored data D. When the storing unit 12 stores alarm condition data indicating the assignment of each item of the stored data D and the assigned direction of the acceleration is detected by the acceleration sensor 14 and is used for the alarming operation, even a mobile terminal apparatus that does not include the touch panel 15 according to the embodiment can perform the same alarming operation, as in the above-described embodiment. Even in this case, the same advantages as those of the above-described embodiment can be obtained.

Furthermore, in the above-described embodiment, the case has hitherto been described in which the touch sensor 15 of the alarming unit 10 is provided as the touch panel only on the surface of the display unit of the mobile terminal apparatus 1, and the upper end portion, the lower end portion, the right end portion, and the left end portion of the touch sensor 15 are set as the detection regions. In a sixth modified example, however, the touch position can be configured to be detected using the coordinates of a position on the touch panel 15. In this case, assignment to each item of the stored data D is performed based on a difference in the coordinates of a touch position on one touch panel 15. More specifically, for example, the touch panel 15 is divided into four regions in the X and Y axes. Then, the upper right region toward the display unit is assigned to "ELECTRONIC MONEY BALANCE" of the stored data D, the right lower region is assigned to "POINT" of the stored data D, the left lower region is assigned to "NUMBER OF ELECTRONIC MAILS UNREAD" of the stored data D, and the upper left region is assigned to "REMAINING TIME UP TO SUBSEQUENT EXPECTED TIME" of the stored data D. When the storing unit 12 stores alarm condition data indicating that the regions on the touch panel 15 are assigned to the items of the stored data D, as described above, the difference between the assigned regions on the touch sensor 15 is detected, and the items of the stored data D are classified, the same alarming operation as in the embodiment can be performed. Even in this case, the same advantages as those of the above-described embodiment can be obtained.

Furthermore, in a seventh modified example, "NUMBER OF ELECTRONIC MAILS UNREAD" of the above-described embodiment is substituted with "DATA AMOUNT OF ELECTRONIC MAILS UNREAD" and the same alarming operation as in the embodiment is performed.

DESCRIPTION OF REFERENCE NUMERALS

1: mobile terminal apparatus
2: information storing unit
10: alarming unit
11: control unit
12: storing unit
13: operation unit
14: acceleration sensor
15: touch sensor
16: sound generating unit
D: stored data
TH, TH2: alarm condition data
THA: acceleration condition data

The invention claimed is:

1. A mobile terminal apparatus comprising:
at least one memory operable to store program code;
at least one processor operable to read the program code and operate as instructed by the program code to provide one of a plurality of alarm sounds, in response to detecting a combination of acceleration of a threshold magnitude or greater, a specific touch position on the mobile terminal apparatus corresponding to one of a plurality of items, and data relating to a threshold magnitude or greater of data of the one of the plurality of items, the program code including:
storing code configured to cause the at least one processor to store information in a storage;
acceleration detecting code configured to cause the at least one processor to detect applied acceleration;
acceleration condition storing code configured to cause the at least one processor to store, in the storage, an acceleration condition data set in advance for the detected acceleration, wherein the acceleration condition data indicates a threshold of a magnitude of the detected acceleration;
alarm condition storing code configured to cause the at least one processor to store an alarm condition set in advance for each of a plurality of items, the alarm condition comprising a combination of information indicating a touch position on a touch panel of the mobile terminal apparatus corresponding to each of the plurality of items, information indicating a plurality of sound tones of an alarm sound corresponding to each threshold data, information indicating threshold data related to the threshold magnitude of data of corresponding items at which a sound tone of the alarm sound is switched at a time of alarming about each item to the user;
correspondence relation information storing code configured to cause the at least one processor to store correspondence relation information indicating respective correspondence relations between a plurality of directions of the detected acceleration and the plurality of items;
alarming code configured to cause the at least one processor to classify the stored information into one of the plurality of items according to a direction of the detected acceleration based on the stored correspondence relation information, and output the alarm sound about the classified information in accordance with an alarming method set in advance in response to detecting the combination of acceleration of a threshold magnitude or greater, the specific touch position on the mobile terminal corresponding to one of the plurality of items, and the data relating to the threshold magnitude or greater of the data of the one of the plurality of items, the alarming method comprising generating a corresponding sound tone of the alarm sound associated with the alarm condition for the item, when it is determined that the magnitude of the detected acceleration is greater than the threshold indicated by the acceleration condition data by reading the acceleration condition data from the storage and comparing the threshold indicated by the acceleration condition data with the magnitude of the detected acceleration, and the stored information classified according to the direction of the detected acceleration satisfies the stored alarm condition for the item; and threshold rewrite code configured to cause the at least one processor to rewrite a value of the threshold of the magnitude of the detected acceleration as the acceleration condition to be stored in the storage, according to a user input.

2. The mobile terminal apparatus according to claim 1, wherein
the stored information includes at least one of electronic value information, mail information, and schedule information.

3. The mobile terminal apparatus according to claim 2, further comprising:
operation code configured to cause the at least one processor to modify the alarm condition.

4. The mobile terminal apparatus according to claim 3, wherein the alarm condition storing code causes the at least one processor to store a plurality of alarm conditions for one kind of the information, and when the magnitude of the detected acceleration is greater than the threshold indicated by the stored acceleration condition data and the stored information satisfies any one of the alarm conditions for the corresponding information, the alarming code causes the at least one processor to alarm about the information in accordance with the alarming method corresponding to any one of the alarm conditions.

5. The mobile terminal apparatus according to claim 2, wherein the alarm condition storing code causes the at least one processor to store a plurality of alarm conditions for one kind of the information, and
when the magnitude of the detected acceleration is greater than the threshold indicated by the stored acceleration condition data and the stored information satisfies any one of the alarm conditions for the corresponding information, the alarming code causes the at least one processor to alarm about the information in accordance with the alarming method corresponding to any one of the alarm conditions.

6. The mobile terminal apparatus according to claim 1, further comprising:
operation code configured to cause the at least one processor to modify the alarm condition.

7. The mobile terminal apparatus according to claim 6, wherein the alarm condition storing code causes the at least one processor to store a plurality of alarm conditions for one kind of the information, and
when the magnitude of the detected acceleration is greater than the threshold indicated by the stored acceleration condition data and the stored information satisfies any one of the alarm conditions for the corresponding information, the alarming code causes the at least one processor to alarm about the information in accordance with the alarming method corresponding to any one of the alarm conditions.

8. The mobile terminal apparatus according to claim 1, wherein the alarm condition storing code causes the at least one processor to store a plurality of alarm conditions for one kind of the information, and
when the magnitude of the detected acceleration is greater than the threshold indicated by the stored acceleration condition data and the stored information satisfies any one of the alarm conditions for the corresponding information, the alarming code causes the at least one processor to alarm about the information in accordance with the alarming method corresponding to any one of the alarm conditions.

9. The mobile terminal apparatus according to claim 1, further comprising:
touch state detecting code configured to cause the at least one processor to detect a touch state of a user among a plurality of touch states and output touch information including information about the detected touch state,
wherein the acceleration detecting code causes the at least one processor to output acceleration information including a result of the detection,
the correspondence relation information storing code causes the at least one processor to further store correspondence relation information indicating respective correspondence relations between the plurality of touch states and the plurality of items,
the alarming code causes the at least one processor to, in response to the acceleration information and the touch information, classify the stored information into one of the plurality of items according to the detected touch state based on the stored correspondence relation information, and alarm about the classified information in accordance with an alarming method set in advance so as to correspond to the alarm condition for the item, when the detected acceleration is greater than the threshold indicated by the acceleration condition data and the stored information classified according to the detected touch state satisfies the stored alarm condition for the item,
the touch state detecting code causes the at least one processor to detect:
a touch position of the user on the touch panel as the touch state;
the number of times the user performs touching on the touch panel as the touch state;
a touch pressure of the user on the touch panel as the touch state; or
an area of a touch region of the user on the touch panel as the touch state, and
the correspondence relation information comprises correspondence relation information indicating:
respective correspondence relations between a plurality of touch positions and the plurality of items;
respective correspondence relations between a plurality of the number of times the user performs the touching and the plurality of items;
respective correspondence relations between a plurality of touch pressures and the plurality of items; or
respective correspondence relations between a plurality of areas of the touch region and the plurality of item.

10. An information processing method being executed in a mobile terminal apparatus, the mobile terminal apparatus comprising: a display unit including a touch panel; a storing means that stores information; an acceleration detecting means that detects applied acceleration; an acceleration condition storing means that stores, in the storage means, an acceleration condition data set in advance for the detected acceleration, wherein the acceleration condition data indicates a threshold of a magnitude of the detected acceleration; an alarm condition storing means that stores an alarm condition set in advance for each of a plurality of items, the alarm condition comprising a combination of information indicating a touch position on the touch panel of the mobile terminal apparatus corresponding to each of the plurality of items, information indicating a plurality of sound tones of an alarm sound corresponding to each threshold data, information indicating threshold data related to the threshold magnitude of data of corresponding items at which a sound tone of the alarm sound is switched at a time of alarming about each item to the user, the information processing method comprising:
provinding one of a plurality of alarm sounds, in response to detecting a combination of acceleration of a threshold magnitude or greater, a specific touch position on the mobile terminal apparatus corresponding to one of a plurality of items, and data relating to a threshold magnitude or greater of data of the one of the plurality of items,
wherein the information processing method further comprises:
detecting a touch state of a user among a plurality of touch states;
storing correspondence relation information indicating respective correspondence relations between the plurality of touch states and the plurality of items;
classifying the stored information into one of the plurality of items according to the detected touch state based on the stored correspondence relation information;
outputting the alarm sound about the classified information in accordance with an alarming method set in advance in response to detecting the combination of acceleration of a threshold magnitude or greater, the specific touch position on the mobile terminal corresponding to one of the plurality of items, and the data relating to the threshold magnitude or greater of the data of the one of the plurality of items, the alarming method comprising generating a corresponding sound tone of the alarm sound associated with the alarm condition for the item, when it is determined that the magnitude of the detected acceleration is greater than the threshold indicated by the acceleration condition data by reading the acceleration condition data from the storage and comparing the threshold indicated by the acceleration condition data with the magnitude of the detected acceleration, and the stored information classified according to the detected touch state satisfies the stored alarm condition for the item; and
rewriting a value of the threshold of the magnitude of the detected acceleration as the acceleration condition to be stored in the storage, according to a user input,
wherein the detecting comprises:
detecting a touch position of the user on the touch panel as the touch state;
detecting the number of times the user performs touching on the touch panel as the touch state;
detecting a touch pressure of the user on the touch panel as the touch state; or
detecting an area of a touch region of the user on the touch panel as the touch state, and
wherein the correspondence relation information is correspondence relation information indicating:
respective correspondence relations between a plurality of touch positions and the plurality of items;
respective correspondence relations between a plurality of the number of times the user performs the touching and the plurality of items;
respective correspondence relations between a plurality of touch pressures and the plurality of items; or
respective correspondence relations between a plurality of areas of the touch region and the plurality of item.

11. An information processing method being executed in a mobile terminal apparatus, the mobile terminal apparatus storing, in a storage, an acceleration condition data set in advance for the detected acceleration, wherein the acceleration condition data indicates a threshold of a magnitude of the detected acceleration, storing an alarm condition set in advance for each of a plurality of items, the alarm condition comprising a combination of information indicating a touch position on a touch panel of the mobile terminal apparatus corresponding to each of the plurality of items, information indicating a plurality of sound tones of an alarm sound corresponding to each threshold data, information indicating threshold data related to the threshold magnitude of data of corresponding items at which a sound tone of the alarm sound is switched at a time of alarming about each item to the user, and storing correspondence relation information indicating respective correspondence relations between a plurality of directions of the detected acceleration and the plurality of items,
the method comprising:
providing one of a plurality of alarm sounds, in response to detecting a combination of acceleration of a threshold magnitude or greater, a specific touch position on the mobile terminal apparatus corresponding to one of a plurality of items, and data relating to a threshold magnitude or greater of data of the one of the plurality of items,
wherein the method further comprises:
detecting the applied acceleration;
classifying the stored information into one of the plurality of items according to a direction of the detected acceleration based on the stored correspondence relation information;
determining whether the magnitude of the detected acceleration is greater than the threshold indicated by the acceleration condition data by reading the acceleration condition data from the storage and comparing the threshold indicated by the acceleration condition data with the magnitude of the detected acceleration;
outputting the alarm sound about the classified information in accordance with an alarming method set in advance in response to detecting the combination of acceleration of a threshold magnitude or greater, the specific touch position on the mobile terminal corresponding to one of the plurality of items, and the data relating to the threshold magnitude or greater of the data of the one of the plurality of items, the alarming method comprising generating a corresponding sound tone of the alarm sound associated with the alarm condition for the item, when the magnitude of the detected acceleration is greater than the threshold indicated by the stored acceleration condition data and the stored information classified according to the direction of the detected acceleration satisfies the stored alarm condition for the item; and
rewriting a value of the threshold of the magnitude of the detected acceleration as the acceleration condition to be stored in the storage, according to a user input.

* * * * *